United States Patent [19]

Galante et al.

[11] Patent Number: 4,941,523

[45] Date of Patent: Jul. 17, 1990

[54] PNEUMATIC TIRE

[75] Inventors: Richard L. Galante, Akron; Terry J. Waibel, Wadsworth; Terrell D. Windham, Hartville, all of Ohio

[73] Assignee: The Goodyear Tire & Rubber Company, Akron, Ohio

[21] Appl. No.: 313,784

[22] Filed: Feb. 23, 1989

[51] Int. Cl.$^5$ .................. B60C 15/06; B60C 21/04
[52] U.S. Cl. .................................. 152/543; 152/510; 152/546
[58] Field of Search ............. 152/502, 503, 504, 510, 152/539, 542, 543, 546, 547, 549

[56] References Cited

U.S. PATENT DOCUMENTS

| | | | |
|---|---|---|---|
| 2,131,636 | 2/1938 | Nellen | 152/362 |
| 2,937,684 | 5/1960 | Rockoff | 152/362 |
| 3,062,257 | 11/1962 | Campbell | 152/510 |
| 3,190,339 | 6/1965 | Leibee et al. | 152/510 |
| 3,301,303 | 5/1964 | Travers | 152/362 |
| 3,871,432 | 3/1975 | Lachut | 152/549 X |
| 3,921,693 | 11/1975 | Suzuki et al. | 152/362 |
| 4,029,138 | 6/1977 | Kresta | 152/362 |
| 4,085,787 | 4/1978 | Maiocchi | 152/362 |
| 4,181,168 | 1/1980 | Gordon | 152/362 |
| 4,202,393 | 5/1980 | Ikeda et al. | 152/330 |
| 4,227,563 | 10/1980 | Grosch | 152/354 |
| 4,263,955 | 4/1981 | Ikeda | 152/330 |
| 4,319,622 | 3/1982 | Iuchi | 152/362 |
| 4,508,153 | 4/1985 | Tanaka et al. | 152/543 |
| 4,699,194 | 10/1987 | Iuchi | 152/543 |

FOREIGN PATENT DOCUMENTS

| | | |
|---|---|---|
| 0127473 | 5/1984 | European Pat. Off. . |
| 3329837 | 2/1985 | Fed. Rep. of Germany ...... 152/503 |
| 1528941 | 6/1968 | France . |

Primary Examiner—Raymond Hoch
Attorney, Agent, or Firm—L. R. Drayer

[57] ABSTRACT

A pneumatic tire has a pair of axially-spaced annular tensile members forming a part of each bead. One or more continuous carcass plies extend between the annular tensile members and have lateral edge portions which are folded axially and radially outwardly around one of the annular tensile members. An air-impermeable liner is disposed axially and radially inwardly of the carcass plies. A layer of air-permeable rubber extends from a point axially inward and radially outward of one of the annular tensile members and is folded axially and radially outwardly around one of the annular tensile members such that the layer of air-permeable rubber abuts a rim flange when the tire is mounted. An air-impermeable gum strip is interposed between the layer of air-permeable rubber and the carcass plies such that the gum strip extends from a point radially outward and axially inward of one of the annular tensile members to a point radially beneath such annular tensile member.

2 Claims, 2 Drawing Sheets

PNEUMATIC TIRE

BACKGROUND OF THE INVENTION

1. Field of Invention

The present invention relates generally to pneumatic tires and more specifically to light truck tires.

2. Description of Related Art

The effective operation of a pneumatic tire depends in part on retaining a quantity of air inside a tire at an elevated pressure. Many tire designers endeavor to retain the inflation pressure via the use of a tire component called a liner. The liner is typically made of a material which has a low air permeability, such as halobutyl. In U.S. Pat. No. 2,937,684 to Rockoff a liner made of butyl rubber is disclosed. Although liners manufactured of butyl and other air-impermeable materials have been somewhat successful in retaining a tire's inflation, some air loss has resulted from air diffusion through the bead area of the tire. Tire designers have sought to correct this problem by modifying the bead area to include air-impermeable rubbers, such as butyl. For example, U.S. Pat. No. 2,937,684 to Rockoff, U.S. Pat. No. 3,921,693 to Suzuki et al, and French Patent No. 1,528,941 disclose bead designs where the liner is extended toward the annular tensile members in order to improve air retention.

SUMMARY OF THE INVENTION

A tire according to the present invention has a pair of beads which, when the tire is mounted on a flanged rim, abut the respective rim flanges. A pair of axially-spaced annular tensile members form a part of each bead. One or more continuous carcass plies extend between the annular tensile members, each carcass ply having a central portion and lateral edge portions. The lateral edge portions are folded axially and radially outwardly around the annular tensile members. An air-impermeable liner is disposed axially and radially inwardly of the carcass ply. A layer of air-permeable rubber extends from a point axially inward and radially outward of one of the annular tensile members toward such annular tensile member. The layer of air-permeable rubber is folded axially and radially outwardly around such annular tensile member such that the layer of air-permeable rubber abuts a rim flange when the tire is mounted. An air-impermeable gum strip is interposed between the layer of air-permeable rubber and the carcass plies. The gum strip extends from a point radially outward and axially inward of the aforesaid one of the annular tensile members to a point radially beneath such annular tensile member.

BRIEF DESCRIPTION OF THE DRAWINGS

Other aspects of the invention will become apparent from the following description when read in conjunction with the accompanying drawings wherein.

DETAILED DESCRIPTION

Figure 1:
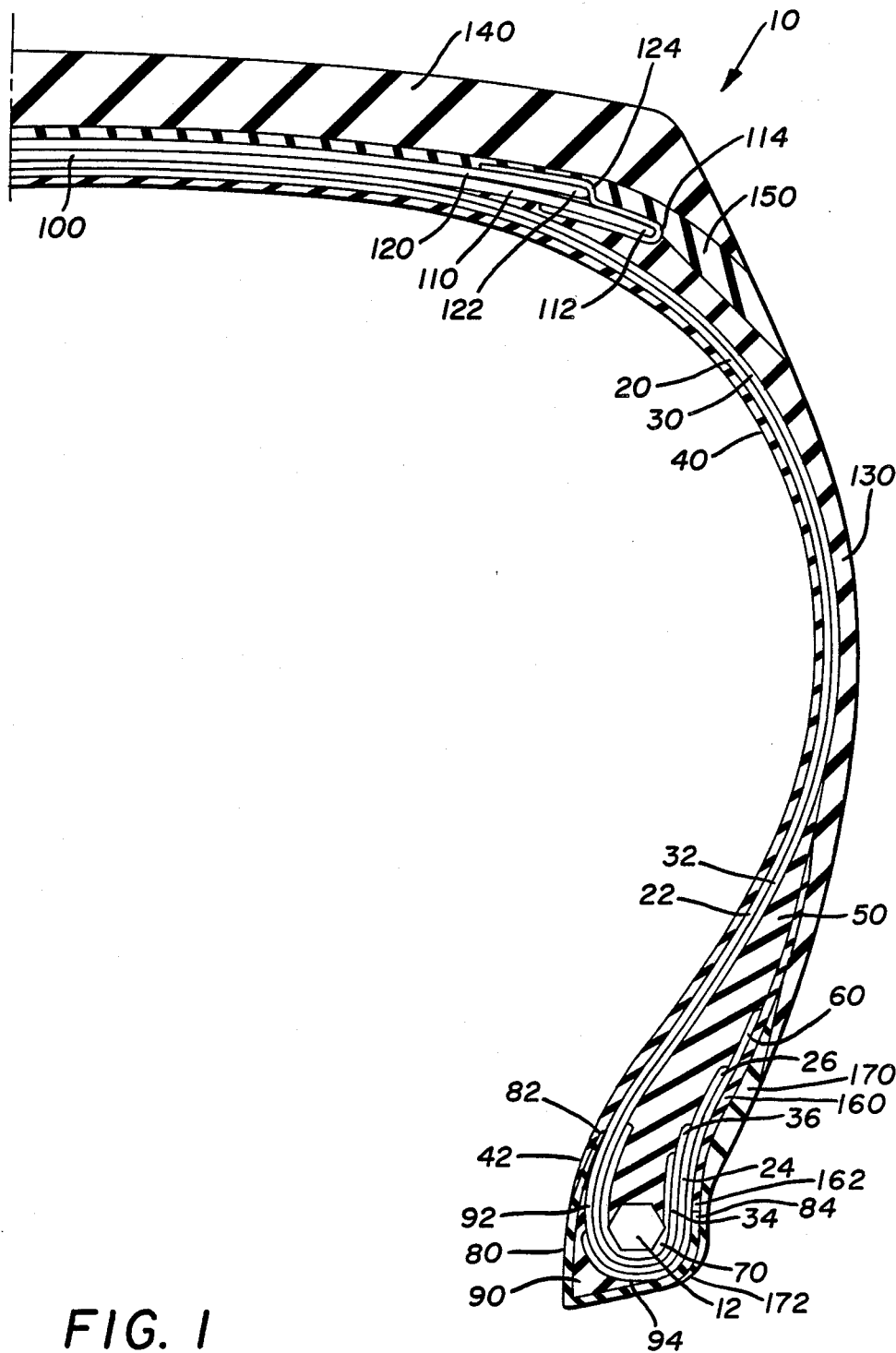
FIG. 1 is a radial cross-sectional view of a tire according to the present invention.

The invention also may be better understood in the context of the following definitions which are applicable both to the specification and to the appended claims:

"Air-impermeable rubber" means a rubber having an air-permeability less than 40% the air permeability of natural rubber. "Air-permeable rubber" means any rubber that is not air-impermeable. Both air-impermeable and air-permeable rubbers can be reinforced.

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two layers or plies of parallel cords, woven or unwoven, underlying the tread, unanchored to the bead, and having both left and right cord angles in the range from 17 degrees to 27 degrees with respect to the equatorial plane of the tire.

"Butyl rubber" means rubber produced by copolymerizing isobutylene with small amounts of isoprene. "Halobutyl rubber" means halogenated butyl rubber, such as with chlorine or bromine.

"Carcass" means the tire structure apart from the belt structure, tread, undertread, and sidewall rubber over the plies, but including the beads.

"Cord" means one of the reinforcement strands of which the plies in the tire are comprised.

"Cord angle", for a cord that crosses the equatorial plane, means the acute angle, left or right in a plan view of the tire, formed by a cord with respect to the equatorial plane. If the cord does not cross the equatorial plane, the "cord angle" means the acute angle formed by the cord with a circumferential line (circle) in the ply. The circumferential line passes through the point at which the "cord angle" is to be measured and is contained in a plane parallel with the equatorial plane. The "left" or "right" orientation of a cord not passing through the equatorial plane is determined by what the orientation would be were the cord to extend across such plane while remaining in the tire. The "cord angle" is measured in a cured but uninflated tire.

"Design rim" means a rim having a specified configuration and width.

"Equatorial plane (EP)" means the plane perpendicular to the tire's axis of rotation and passing through the center of its tread.

"Liner" means the layer or layers of elastomer or other material that form the inside surface of a tubeless tire and that contain the inflating fluid within the tire.

"Ply", unless otherwise specified, means a continuous layer of rubber-coated parallel cords.

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Radial" and "radially" are used to mean directions radially toward or away from the axis of rotation of the tire.

"Sidewall" means that portion of a tire between the tread and the bead.

"Tread" means a molded rubber component which, when bonded to a tire casing, includes that portion of the tire that comes into contact with the road when the tire is normally inflated and under normal load.

In the drawings, the same numerals are used for the same components or items in the several views. With particular reference now to FIG. 1, there is illustrated a pneumatic tire 10 constructed in accordance with the present invention.

The tire 10 has a pair of axially-spaced apart annular tensile members 12. The annular tensile members are shown as wire filaments arranged in a hexagonal cross section but this is not believed to be essential to the invention and the annular tensile members could have been circular or of other well known cross sections or could be manufactured of cables or other materials.

In the preferred embodiment, two circumferentially extending radially superposed first and second carcass plies 20,30 extend continuously between the annular tensile members 12. Each of the first and second carcass plies has a central portion 22,32 disposed between the two annular tensile members. Lateral edge portions 24,34 of each of the first and second carcass plies are folded axially and radially outwardly around their respective annular tensile members.

Any material commonly used in the art for carcass ply reinforcement can be used for the cords of the first and second carcass plies 20,30, but polyester is the preferred material because of its availability and ride properties. Other reinforcements that can be successfully used, but are not preferred, are nylon, aromatic polyamide, rayon and steel. When only one carcass ply is used, steel is the preferred reinforcement. The cords of the first and second carcass plies are oriented at angles between 65 degrees and 90 degrees with respect to the equatorial plane EP of the tire. Preferably, the cords in the first carcass ply 20 are oriented at 90 degrees and the cords in the second carcass ply are also oriented at 90 degrees.

A liner 40 is disposed radially inwardly of the first and second carcass plies. The edges 42 of the liner are disposed radially outwardly of the annular tensile members 12. The liner is made of an air-impermeable material which offers high resistance to air permeation and can withstand high levels of flexing in the sidewall area. The preferred material is a halobutyl rubber. Halobutyl rubber, whether chlorobutyl or bromobutyl, has proven to be more air-impermeable than natural or styrene butadiene rubber. Steel-belted radial passenger tires with 60% bromobutyl and 100% bromobutyl liners were tested for air retention. The test measured the number of days for the inflation pressure to drop from 260 KPa to 165 KPa at 65 degrees C. Test results showed the styrene butadiene liners to be 82% as permeable to air as were liners made of natural rubber. Liners made of 60% bromobutyl rubber were 37% as permeable and liners made of 100% bromobutyl were 12% as permeable as the natural rubber liners. For purposes of this invention, a rubber with an air-permeability less than 40% will be considered an "air-impermeable" rubber and a rubber with an air-permeability of at least 40% will be considered an "air-permeable" rubber.

Figure 2:
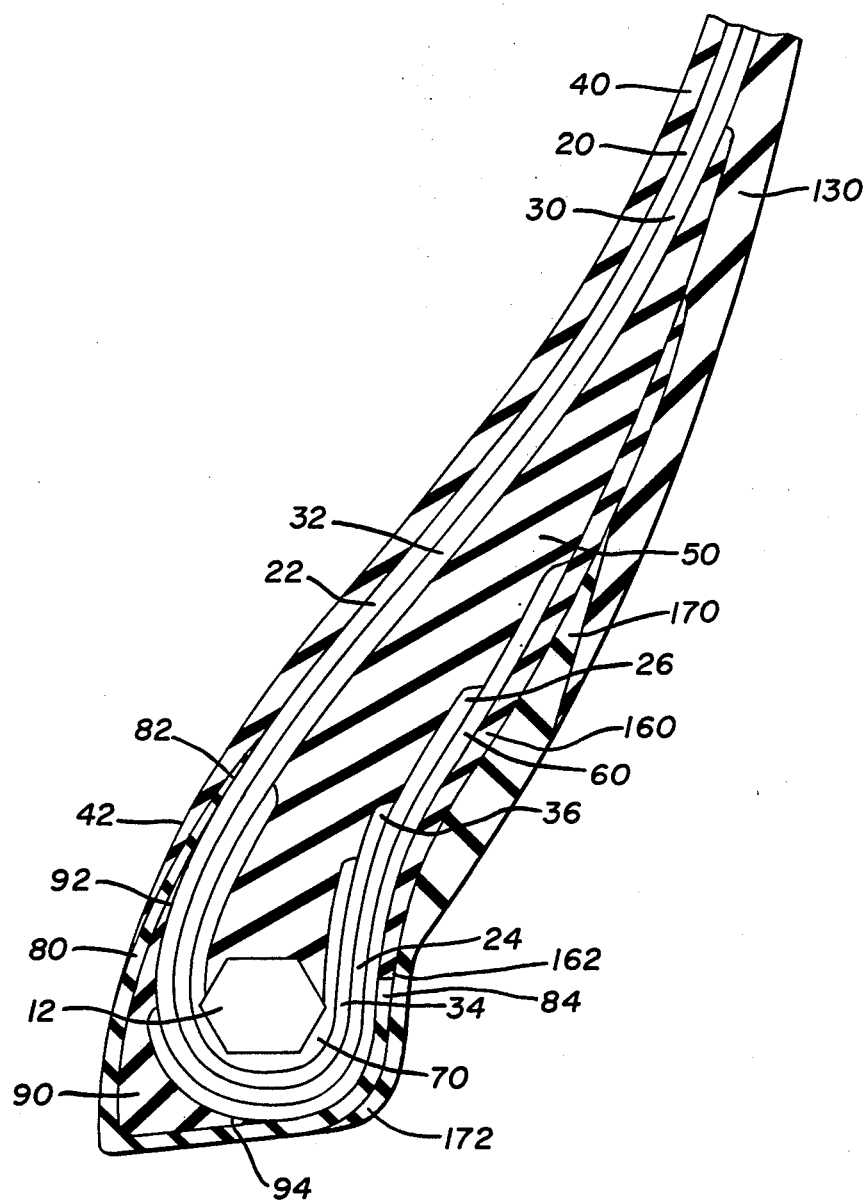
FIG. 2 is an enlarged radial cross-sectional view of the bead area of a tire according to the present invention.

As shown best in FIG. 2, an apex 50 may be disposed between each annular tensile member in the central portion 22,32 and the lateral edge portions 24,34 of the carcass ply or plies 20,30. The apex preferably is unreinforced and is made of a resilient material. It acts as a stress transition component to disperse the stresses at the carcass ply endings and at the end of a chipper 60. The apex also provides stiffness and stability in the lower sidewall area. Apexes can be made of stiffer materials if a higher degree of lateral stiffness is required.

The chipper 60 is a reinforced ply which also disperses stresses at the carcass ply endings and adds stability to the tire sidewall. The chipper is commonly reinforced with cords made of steel, rayon, nylon, or polyester. The preferred chipper reinforcement is nylon cord which is made of three strands of 1260 denier cord twisted together to form a single cord. This cord is arranged in a density (endcount) equal to about 19 cords per inch.

The flipper 70 is a reinforced ply which locks the annular tensile members 12 to the apex 50 and provides rigidity to the lower bead and sidewall area. The flipper can be reinforced with a cord material like that used for the chipper 60 or a square woven material can instead be used. The reinforcement can be made of steel, rayon, nylon and polyester or other such reinforcing materials. The reinforcing material is preferably coated with a relatively stiff rubber. The use of a flipper is not believed to be necessary to practice the invention. In the preferred embodiment, a flipper reinforced with a square woven nylon material is used.

A toe guard 80 is a layer of air-permeable rubber. Its first edge 82 is located axially inward and radially outward of the annular tensile members and overlaps the edge 42 of the liner 40. The toeguard 80 extends from its first edge 82, radially inward and underneath the annular tensile members 12, and is folded radially and outwardly around the annular tensile members, so that its second edge 84 is disposed axially outwardly of the annular tensile members. The toe guard provides rigidity to the bead area as well as resistance to damage during the mounting and dismounting of the tire. The toeguard is made of a relatively hard rubber and may be reinforced. In the preferred embodiment the toeguard is reinforced with nylon cord.

The bead toe 90 is formed from an unreinforced, air-impermeable gum strip located in the bead area of the tire and disposed between the toe guard 80 and the carcass plies 20,30 or chipper 60. The first edge 92 of the bead toe extends from a point radially outward and axially inward of one of the annular tensile members 12 to a second edge 94 disposed radially beneath such annular tensile member. Preferably, the first edge of the bead toe is radially outward of the edge 42 of the liner 40, so that they overlap. The first edge of the bead toe overlaps the edge of the liner in order to provide improved resistance to air permeation.

The hard gum chafer 170 is formed from high modulus rubber and is preferably unreinforced. Its radially innermost edge 172 abuts the rim base while the remainder of the hard gum chafer may abut the rim flange. The hard gum chafer protects the tire from premature damage caused by chafing against the rim.

The transitional apex 160 is an unreinforced layer of relatively low modulus rubber. It acts as a transition between adjacent components of higher modulus, namely, the chipper 60 and the hard gum chafer 170. The radially innermost edge 162 of the transitional apex abuts the second edge 84 of the toe guard 80.

With reference now to FIG. 1, a belt structure 100 comprises a plurality of belt plies of the type well known in the art. The belt structure 100 is disposed radially outwardly of the carcass plies 20,30. The first belt ply 110 is interposed between the second belt ply 120 and the carcass plies. Each of the belt plies is generally of the same construction. Typically the belt plies are reinforced with cords made of steel, fiberglass, or an aromatic polyamide. Preferably the belts are reinforced with steel cords. Preferably, the edges 112,122 of the belt plies are wrapped with a belt edge gum strip 114,124. The gum strip acts as a transition component between the belt material, which is normally fairly rigid, and the tread, which is considerably more pliable. In the preferred embodiment, the belt edge gum strips are made of a rubber similar to the rubber material used in the belt plies, and are not reinforced.

The sidewalls 130 of the tire 10 include outer elastomeric portions that extend radially inwardly from the belt structure 100 and tread 140 to the annular tensile member portions of the tire. The first edge of the sidewall is disposed radially and axially inwardly of the edge portion 112 of the first belt ply 110. This portion of the sidewall acts as a transition component to disperse the loads and stresses in the area of the edges 112,122 of the belt plies to the carcass plies 20,30. The sidewall is generally unreinforced and is manufactured of a rubber designed to resist chemical reactions to oxygen, ozone, and sunlight and must be resilient and flexible to withstand the flexing of the tire under normal operating conditions.

The tread 140 is made of an abrasion-resistant rubber designed to provide good wear and traction properties throughout the life of the tire. The tread is preferably grooved and formed with a tread design directed toward optimizing traction and wear.

A tread skirt 150 is disposed between the lateral edges of the tread 140 and the sidewall 130. The tread skirt is unreinforced and is made of a rubber designed to withstand a high degree of flexing and scuffing.

Based on the foregoing description of the invention, what is claimed is:

1. A pneumatic tire comprising:
   a pair of axially spaced apart annular tensile members;
   one or more continuous carcass plies extending between the annular tensile members, each carcass ply comprising cords selected from the group consisting of steel cords and polyester cords, each carcass ply having a central portion and lateral edge portions, each of the lateral edge portions being folded axially and radially outwardly around one of said annular tensile members;
   a belt structure comprising a plurality of belt plies reinforced with steel cords disposed radially outwardly of the carcass plies;
   an air-impermeable line forming an inside surface of the tire with each edge of the liner disposed radially outwardly and axially inwardly of the associated annular tensile member;
   a layer of air-permeable rubber reinforced with nylon cord is disposed in the area of each annular tensile member extending from a first edge located axially inward and radially outward of the associated annular tensile member such that said layer of air permeable rubber is in overlapping relationship with said liner toward said annular tensile member, the layer of air-permeable rubber being folded axially radially outwardly around said annular tensile member such that a second edge of the layer of air-permeable rubber is disposed axially outwardly of the carcass plies; and
   a cordless air-impermeable gum strip interposed between the layer of air-permeable rubber and the carcass plies, the gum strip extending from a first edge disposed radially outward and axially inward of the associated annular tensile member to a second edge disposed radially inward of said annular tensile member, the first edge of said air permeable gum strip being disposed radially outward of the associated edge of said air-impermeable liner.

2. A tire as in claim 1 wherein one edge of the air-impermeable gum strip extends radially outwardly to a radial dimension approximately equal to the radial dimension to the radially innermost edge of the air-impermeable liner.

* * * * *